US011899127B2

(12) United States Patent
Crouch et al.

(10) Patent No.: US 11,899,127 B2
(45) Date of Patent: Feb. 13, 2024

(54) VIRTUAL ANTENNA ARRAY WITH DISTRIBUTED APERTURE

(71) Applicant: Aurora Innovation, Inc., Palo Alto, CA (US)

(72) Inventors: Stephen Crouch, Bozeman, MT (US); Chunshu Li, San Jose, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 493 days.

(21) Appl. No.: 17/132,077

(22) Filed: Dec. 23, 2020

(65) Prior Publication Data
US 2022/0099795 A1    Mar. 31, 2022

Related U.S. Application Data

(60) Provisional application No. 63/085,865, filed on Sep. 30, 2020.

(51) Int. Cl.
*G01S 7/35* (2006.01)
*H01Q 3/36* (2006.01)
(Continued)

(52) U.S. Cl.
CPC .......... *G01S 7/354* (2013.01); *G01S 13/003* (2013.01); *G01S 13/583* (2013.01);
(Continued)

(58) Field of Classification Search
CPC ...... G01S 7/354; G01S 13/003; G01S 13/583; G01S 13/931; G01S 13/426;
(Continued)

(56) References Cited

U.S. PATENT DOCUMENTS 10,401,495 B2    9/2019  Crouch
2017/0176583 A1  6/2017  Gulden
(Continued)

FOREIGN PATENT DOCUMENTS

CN    109212499 A  *  1/2019  .......... G01S 13/867
DE  102018206533 A1 * 10/2019  ............ G01S 13/06
(Continued)

OTHER PUBLICATIONS

Wikipedia; MIMO Radar, last updated Dec. 16, 2020.
(Continued)

*Primary Examiner* — Timothy A Brainard
*Assistant Examiner* — Ismaaeel A. Siddiquee
(74) *Attorney, Agent, or Firm* — Gray Ice Higdon

(57) ABSTRACT

A multiple input multiple output (MIMO) radar system synthesizes a virtual antenna array where at least a subset of the transmit antennas and receive antennas forming the virtual antenna array are disposed in different local oscillator domains. In some instances, doing so enables radar sensors to be constructed using multiple Antenna On Package (AOP) devices that lack support for cascading or that otherwise would have limited angular resolution on their own to adequately discriminate between various objects in the environment of an autonomous or other vehicle to be used collectively by a vehicle control system in connection with the autonomous control of a vehicle.

16 Claims, 6 Drawing Sheets

(51) Int. Cl.

| | |
|---|---|
| *G01S 13/931* | (2020.01) |
| *G01S 13/58* | (2006.01) |
| *G01S 13/00* | (2006.01) |
| G01S 13/42 | (2006.01) |
| G01S 13/34 | (2006.01) |
| G01S 13/87 | (2006.01) |
| G01S 7/40 | (2006.01) |

(52) U.S. Cl.
CPC ............. *G01S 13/931* (2013.01); *H01Q 3/36* (2013.01); *G01S 7/4026* (2013.01); *G01S 13/343* (2013.01); *G01S 13/42* (2013.01); *G01S 13/426* (2013.01); *G01S 13/584* (2013.01); *G01S 13/878* (2013.01)

(58) Field of Classification Search
CPC ...... G01S 13/343; G01S 13/42; G01S 13/584; G01S 13/878; G01S 7/4026; H01Q 3/36
See application file for complete search history.

(56) References Cited

U.S. PATENT DOCUMENTS

| | | | |
|---|---|---|---|
| 2018/0128912 A1 | 5/2018 | Bialer | |
| 2019/0339388 A1 | 11/2019 | Crouch | |
| 2020/0292666 A1 | 9/2020 | Maher | |
| 2020/0300995 A1 | 9/2020 | Wu | |
| 2020/0301002 A1* | 9/2020 | Wu | G01S 7/41 |
| 2021/0373152 A1* | 12/2021 | Roh | H01Q 1/3233 |
| 2022/0099817 A1 | 3/2022 | Crouch et al. | |

FOREIGN PATENT DOCUMENTS

| | | | | |
|---|---|---|---|---|
| DE | 102018207718 | | 11/2019 | |
| DE | 102018210070 A1 * | | 12/2019 | ........... G01S 13/325 |
| EP | 3652497 | | 5/2020 | |
| EP | 3690483 | | 8/2020 | |
| FR | 3062524 A1 * | | 8/2018 | ......... H01Q 21/0006 |
| JP | 6494869 B1 * | | 4/2019 | ............. G01S 13/28 |
| LU | 100130 | | 9/2018 | |
| WO | 2019014177 | | 1/2019 | |
| WO | WO 2019126386 | | 6/2019 | |
| WO | 2022072485 | | 4/2022 | |
| WO | 2022072488 | | 4/2022 | |

OTHER PUBLICATIONS

Giannini et al; "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014.

Bourdoux et al; "PMCW waveform and MIMO technique for a 79 GHz CMOS automotive radar," 2016 IEEE Radar Conference (RadarConf), Philadelphia, PA, 2016, pp. 1-5.

Overdevest et al; "Doppler Influence on Waveform Orthogonality in 79 GHz MIMO Phase-Coded Automotive Radar," in IEEE Transactions on Vehicular Technology, vol. 69, No. 1, pp. 16-25, Jan. 2020.

Pfeffer et al; "FMCW MIMO Radar System for Frequency-Division Multiple TX-Beamforming," in IEEE Transactions on Microwave Theory and Techniques, vol. 61, No. 12, pp. 4262-4274, Dec. 2013.

Texas Instruments; Application Report—AWR2243 Cascade; Oct. 2017.

Och et al; "A Scalable 77 GHz Massive MIMO FMCW Radar by Cascading Fully-Integrated Transceivers," 2018 Asia-Pacific Microwave Conference (APMC), Kyoto, 2018, pp. 1235-1237.

Texas Instruments; "mmWave cascade imaging radar RF evaluation module"; https://www.ti.com/tool/MMWCAS-RF-EVM [retrieved from internet wayback machine]; Oct. 9, 2019.

Texas Instruments; "AWR1843"; https://www.ti.com/tool/MMWCAS-RF-EVM [retrieved from internet wayback machine]; Jan. 10, 2019.

"Guermandi et al., ""A 79GHz 2×2 MIMO PMCW radar SoC in 28nm CMOS,"" 2016 IEEE AsianSolid-State Circuits Conference (A-SSCC), Toyama, 2016, pp. 105-108, doi:10.1109/ASSCC.2016.7844146."

European Patent Office, International Search Report and Written Opinion for PCT/US2021/052639 dated Dec. 22, 2021.

European Patent Office, International Search Report and Written Opinion for PCT/US2021/052642 dated Jan. 19, 2022.

* cited by examiner

VIRTUAL ANTENNA ARRAY WITH DISTRIBUTED APERTURE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular technology that is increasingly relied upon for collecting information about a vehicle's surrounding environment is radar, which is based on the emission, reflection and sensing of radio wave electromagnetic radiation within an environment to detect, and in some instances, determine the position and velocity of various objects within the environment. Despite continuing improvements to radar performance, however, both cost and technical limitations continue to exist, so a continuing need exists for improvements to radar technology, and particularly for radar technology used in connection with the control of an autonomous vehicle.

SUMMARY

The present disclosure is generally related to multiple input multiple output (MIMO) radar systems, e.g., for use in automotive applications such as in autonomous vehicles, that synthesize virtual antenna arrays where at least a subset of the transmit antennas and receive antennas forming the virtual antenna arrays are disposed in different local oscillator domains. In some instances, and while the techniques disclosed herein may be used in other applications, the techniques described herein may be used to enable radar sensors to be constructed using multiple Antenna On Package (AOP) devices that lack support for cascading or that otherwise would have limited angular resolution on their own to adequately discriminate between various objects in the environment of an autonomous or other vehicle to be used collectively by a vehicle control system in connection with the autonomous control of a vehicle.

Therefore, consistent with one aspect of the invention, a radar sensor may include a plurality of multiple input multiple output (MIMO) radar transceiver devices, each including one or more transmitters and one or more receivers disposed within a local oscillator domain, and control logic coupled to the plurality of MIMO radar transceiver devices and configured to synthesize a virtual antenna array with a distributed aperture using the plurality of MIMO radar transceiver devices, the virtual antenna array including a first set of virtual array elements defined by one or more pairs of transmitters and receivers from the same local oscillator domain and a second set of virtual array elements defined by one or more pairs of transmitters and receivers from different local oscillator domains.

Moreover, in some implementations, each MIMO radar transceiver device includes an antenna-on-package device including a transmit antenna for each transmitter and a receive antenna for each receiver in the respective MIMO radar transceiver device. In some implementations, the MIMO radar transceiver devices have a same antenna layout for the transmit and receive antennas thereon and are disposed on a common circuit board. Further, in some implementations, at least one of the MIMO radar transceiver devices is mounted on the circuit board in a different rotational orientation from at least one other MIMO radar transceiver device. Also, in some implementations, the plurality of MIMO radar transceiver devices includes first, second, third and fourth MIMO radar transceiver devices respectively arranged in upper left, upper right, lower right and lower left positions of a two-by-two array, and the first and third MIMO radar transceiver devices are each mounted on the circuit board at about a 180 degree rotational orientation relative to the second and fourth MIMO radar transceiver devices.

Further, in some implementations, the MIMO radar transceiver devices are arranged on the circuit board with lambda/2 spacing. Also, in some implementations, the MIMO radar transceiver devices are non-cascadable transceiver devices. In addition, in some implementations, the control logic is configured to trigger frequency modulated continuous wave (FMCW) chirps one or more of the MIMO radar transceiver devices using a trigger input thereon.

Moreover, in some implementations, the control logic is configured to apply a global phase correction for the one or more pairs of transmitters and receivers in the second set of virtual array elements. In some implementations, the control logic is configured to apply the global phase correction for the one or more pairs of transmitters and receivers in the second set of virtual array elements after performing a Doppler transformation operation for the one or more pairs of transmitters and receivers in the second set of virtual array elements.

Further, in some implementations, the control logic is configured to apply the global phase correction by performing initial beamforming to generate a set of initial beamvectors, identifying one or more correlated points from one or more pairs of transmitters and receivers in at least one of the first and second sets of virtual array elements, generating a set of ideal beamvectors for at least one of the MIMO radar transceiver devices, and generating the global phase correction by comparing the set of ideal beamvectors to the set of initial beamvectors.

In some implementations, the control logic is configured to align range profiles for the one or more pairs of transmitters and receivers in the second set of virtual array elements. Moreover, in some implementations, the control logic is configured to align the range profiles for the one or more pairs of transmitters and receivers in the second set of virtual array elements after performing a range transformation operation for the for the one or more pairs of transmitters and receivers in the second set of virtual array elements, and to perform transmitter code demodulation for the one or more pairs of transmitters and receivers in the second set of virtual array elements after aligning the range profiles for the one or more pairs of transmitters and receivers in the second set of virtual array elements.

Some implementations may further include a plurality of local oscillator domains, and each of the plurality of MIMO radar transceiver devices is disposed within a local oscillator domain among the plurality of local oscillator domains such that any MIMO radar transceiver devices disposed within the same local oscillator domain operate using a common local oscillator signal, and any MIMO-radar transceiver devices disposed within different local oscillator domains operate using separate local oscillator signals. In some implementations, the radar sensor includes an automotive imaging radar sensor.

Consistent with another aspect of the invention, a method may include receiving radar data from a plurality of multiple input multiple output (MIMO) radar transceiver devices, each including one or more transmitters and one or more receivers disposed within a local oscillator domain, and synthesizing a virtual antenna array with a distributed aperture using the radar data received from the plurality of MIMO radar transceiver devices, the virtual antenna array including a first set of virtual array elements defined by one or more pairs of transmitters and receivers from the same local oscillator domain and a second set of virtual array elements defined by one or more pairs of transmitters and receivers from different local oscillator domains.

Also, in some implementations, synthesizing the virtual antenna array with the distributed aperture includes applying a global phase correction for the one or more pairs of transmitters and receivers in the second set of virtual array elements. Moreover, in some implementations, applying the global phase correction is performed after performing a Doppler transformation operation for the one or more pairs of transmitters and receivers in the second set of virtual array elements.

In addition, in some implementations, applying the global phase correction includes performing initial beamforming to generate a set of initial beamvectors, identifying one or more correlated points from one or more pairs of transmitters and receivers in at least one of the first and second sets of virtual array elements, generating a set of ideal beamvectors for at least one of the MIMO radar transceiver devices, and generating the global phase correction by comparing the set of ideal beamvectors to the set of initial beamvectors. Also, in some implementations, synthesizing the virtual antenna array with the distributed aperture includes aligning range profiles for the one or more pairs of transmitters and receivers in the second set of virtual array elements. In some implementations, aligning the range profiles for the one or more pairs of transmitters and receivers in the second set of virtual array elements is performed after performing a range transformation operation for the for the one or more pairs of transmitters and receivers in the second set of virtual array elements, and synthesizing the virtual antenna array with the distributed aperture includes performing transmitter code demodulation for the one or more pairs of transmitters and receivers in the second set of virtual array elements after aligning the range profiles for the one or more pairs of transmitters and receivers in the second set of virtual array elements.

Consistent with another aspect of the invention, a program product may include a non-transitory computer readable medium, and program code stored on the non-transitory computer readable medium and configured upon execution by one or more processors to synthesize a virtual antenna array with a distributed aperture using a plurality of multiple input multiple output (MIMO) radar transceiver devices, each MIMO radar transceiver device including one or more transmitters and one or more receivers disposed within a local oscillator domain, and the virtual antenna array including a first set of virtual array elements defined by one or more pairs of transmitters and receivers from the same local oscillator domain and a second set of virtual array elements defined by one or more pairs of transmitters and receivers from different local oscillator domains.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The herein-described implementations are generally directed to various improvements associated with multiple input multiple output (MIMO) radar sensors, e.g., for use in connection with the control of an autonomous or other type of vehicle, among other applications. Prior to discussing such improvements, however, a brief discussion of an autonomous vehicle environment and of MIMO radar sensors are provided below.

Autonomous Vehicle Environment

Figure 1:
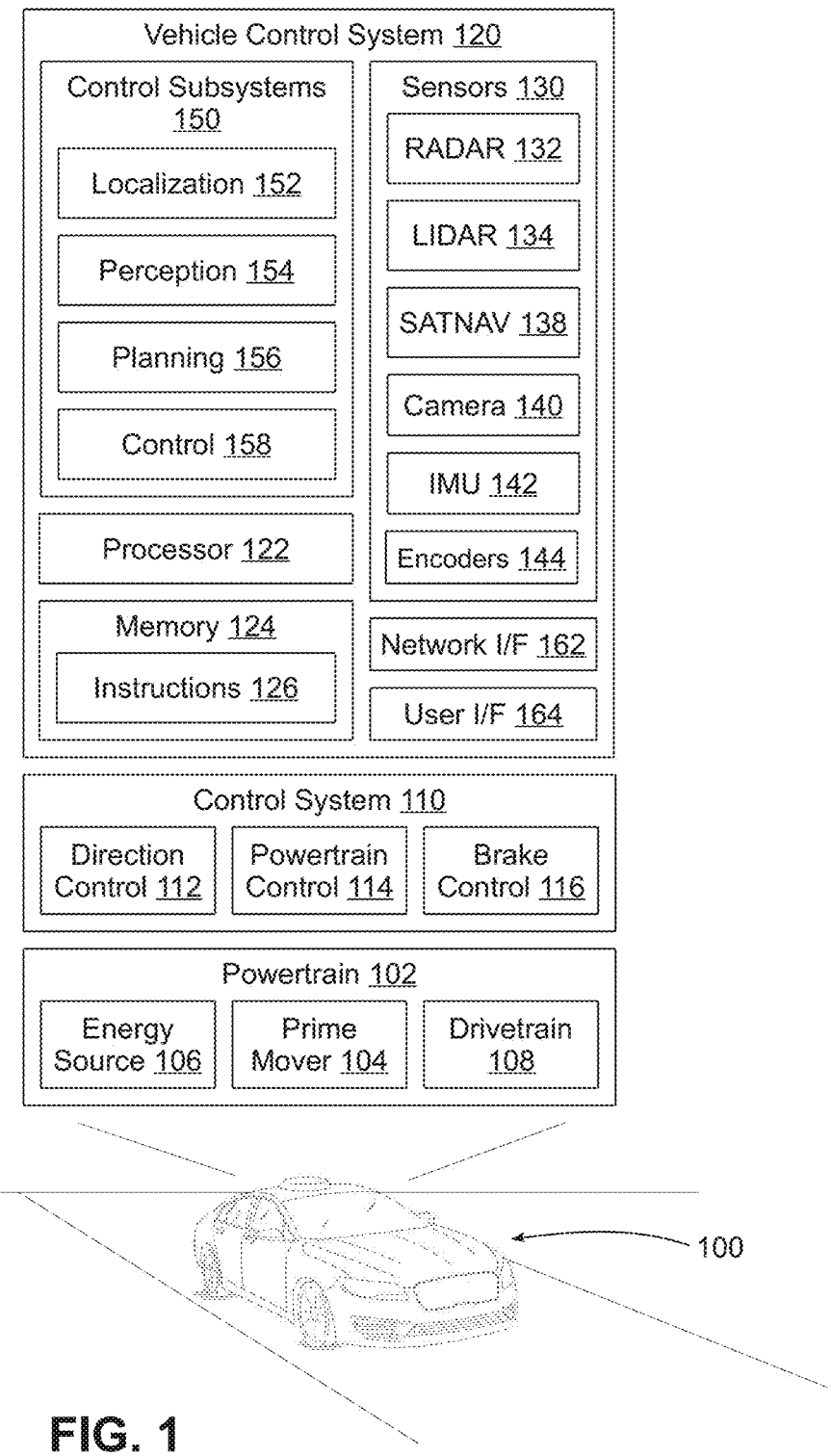
FIG. 1 illustrates an example environment in which implementations disclosed herein can be implemented.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, sensors 130 may include one or more Radio Detection and Ranging (RADAR) sensors, with which a number of the techniques described herein may be implemented.

Sensors 130 may also optionally include one or more Light Detection and Ranging (LIDAR) sensors 132, as well as one or more satellite navigation (SATNAV) sensors 138, e.g., compatible with any of various satellite navigation systems such as GPS, GLONASS, Galileo, Compass, etc. Each SATNAV sensor 138 may be used to determine the location of the vehicle on the Earth using satellite signals. Sensors 130 may also optionally include one or more cameras 140, one or more inertial measurement units (IMUS) 142, one or more wheel encoders 144, or a combination thereof. Each camera 140 may be a monographic or stereographic camera and may record one or more of still and video imagers. Each IMU 142 may include multiple gyroscopes and accelerometers capable of detecting linear and rotational motion of the vehicle 100 in three directions. Wheel encoders 144 may be used to monitor the rotation of one or more wheels of vehicle 100.

The outputs of sensors 130 may be provided to a set of control subsystems 150, including, for example, a localization subsystem 152, a perception subsystem 154, a planning subsystem 156, and a control subsystem 158. As will become more apparent hereinafter, radar sensors 132 may be used by one or more of such subsystems 152-158 to control an autonomous vehicle.

Localization subsystem 152 may be principally responsible for precisely determining the location and orientation (also sometimes referred to as "pose") of vehicle 100 within its surrounding environment, and generally within some frame of reference.

Perception subsystem 154 may be principally responsible for detecting, tracking and identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, and as described herein, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

MIMO Radar Sensors

Figure 2:
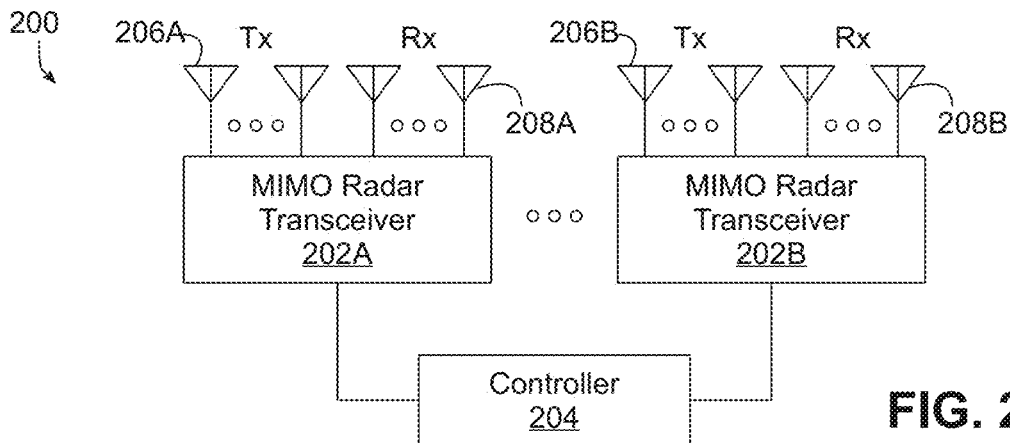
FIG. 2 illustrates an example implementation of a Multiple Input Multiple Output (MIMO) radar sensor that may be utilized by implementations disclosed herein.

FIG. 2 next illustrates an example radar sensor 200 within which the various techniques described herein may be implemented. In some implementations, radar sensor 200 may be a distributed radar sensor. In some implementations, sensor 200 includes one or more MIMO radar transceivers (e.g., transceivers 202A and 202B) coupled to a controller 204, with each MIMO radar transceiver generally including multiple transmit (Tx) antennas (e.g., transmit antennas 206A, 206B) and multiple receive (Rx) antennas (e.g., receive antennas 208A, 208B) to implement a phased antenna array.

Each transceiver 202A, 202B may be disposed on a separate integrated circuit (IC) or chip in some implementations, while in other implementations multiple transceivers may be disposed on the same chip. Further, multiple transceivers 202A, 202B may be disposed on separate or common modules, boards, cards, or housings in various implementations. In addition, it will be appreciated that, rather than utilizing transceivers that handle both transmission and reception of radar signals, some implementations may utilize separate circuitry for these functions.

Controller 204 is generally coupled to one or more transceivers. For example, controller 204 is coupled to each transceiver 202A, 202B for controlling both (i) the generation of radar signals for transmission or emission by transmit antennas 206A, 206B and (ii) the reception and processing of radar signals received by receive antennas 208A, 208B. It will be appreciated that the functionality implemented by controller 204 may be allocated in various manners in different implementations, e.g., using one or more chips that are separate from each transceiver 202A, 202B and disposed on the same or different module, board, card or housing, or being wholly or partially integrated into the same chips as one or more of the transceivers. The functionality of controller 204 may also be at least partially implemented external of any radar sensor in some implementations, e.g., integrated into other processors or controllers in the vehicle control system of an autonomous vehicle. Further, while a single controller 204 is illustrated in FIG. 2, the invention is not so limited, as multiple controllers may be used to implement different functionality in a radar sensor in some implementations, e.g., using multiple controllers integrated with each transceiver 202A, 202B. In some implementations, one or more of controller 204 and transceivers 202A, 202B may be implemented using one or more Monolithic Microwave Integrated Circuits (MMICs).

As such, it will be appreciated that the functionality described herein may in some implementations be implemented using various types of control logic, whether integrated into a transmitter, receiver or transceiver, processor, controller, computer system, etc., whether disposed on one or more integrated circuit chips, and whether incorporating hardwired logic or programmable logic capable of executing program code instructions. Control logic may also be considered to include analog circuitry, digital circuitry, or both in various implementations. As such, the invention is not limited to the particular control logic implementation details described herein.

Likewise, transmit antennas 206A, 206B and receive antennas 208A, 208B may be implemented in a wide variety of manners, e.g., as patch antennas disposed on one or more printed circuit boards or cards, or in some instances disposed on or in a package or chip and thus integrated with a transceiver or controller of the radar sensor, e.g., using antenna on packaging (AOP) or antenna on chip (AOC) technology. Antennas 206A, 206B, 208A, 208B may be omnidirectional or directional in different implementations. In some implementations, the same antennas may be used for both transmit and receive; however, in the illustrated implementations, separate antennas are used to handle the transmission and reception of radar signals. Therefore, a reference to an antenna as being a transmit antenna or a receive antenna herein does not necessarily require that the antenna be used exclusively for that purpose.

Figure 3:
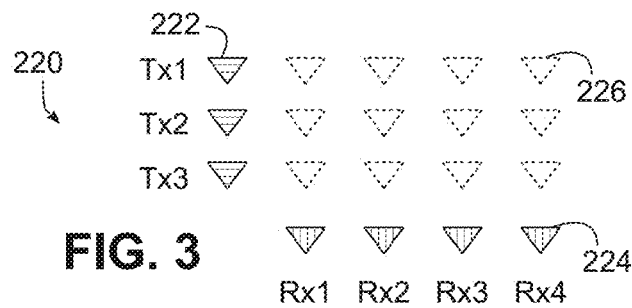
FIG. 3 illustrates an example virtual antenna array capable of being produced by a MIMO radar sensor that may be utilized by implementations disclosed herein.

Antennas 206A, 206B, 208A, 208B in the illustrated implementations are desirably physical arranged and electronically controlled to implement a MIMO virtual antenna array (VAA), i.e., an array of virtual array elements that individually represent unique transmit/receive antenna pairs. FIG. 3, for example, illustrates an example virtual antenna array 220 formed from a set of three physical transmit antennas 222 (Tx1, Tx2, Tx3, each of which corresponding, for example, to a transmit antenna 206A, 206B in FIG. 2) and four physical receive antennas 224 (Rx1, Rx2, Rx3, Rx4, each of which corresponding, for example, to a receive antenna 208A, 208B in FIG. 2), which together form a virtual antenna array having a 3×4 or 12 element array of virtual array elements 226, thereby increasing the effective number of antennas and improving cross-range resolution. It will be appreciated that different numbers or arrangements of physical transmit and receive antennas may be used to form different sizes and arrangements of virtual antenna arrays, so the invention is not limited to the specific array illustrated in FIG. 3.

Increasing the numbers of physical transmit antennas and physical receive antennas for a virtual antenna array, and thus the number of virtual array elements in the virtual antenna array, may generally be used to increase angular resolution, detection range or signal to noise ratio. In one example implementation, an individual transceiver chip having three transmit antennas and four receive antennas may be used to form a virtual antenna array having twelve virtual array elements, which may, in some instances, be used to form a one dimensional array of <5 cm length (e.g., emphasizing azimuth resolution) or in other instances form a two dimensional of at most about 1 cm×1 cm (e.g., providing coarse resolution in both azimuth and elevation). If four of such transceiver chips are used in the same virtual antenna array, however, a total of 12 transmit antennas and 16 receive antennas may be used to generate 192 virtual array elements. Such element counts may be used for example, to generate two dimensional array layouts over about a 10 cm×10 cm area, and allowing for an angular resolution of a few degrees in both azimuth and elevation.

Figure 4:
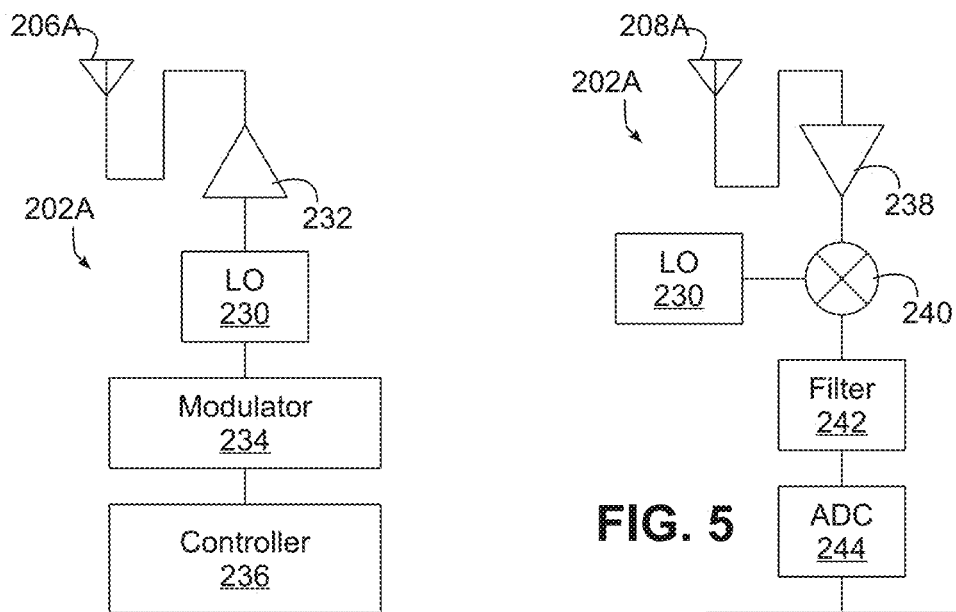
FIG. 4 illustrates an example transmitter channel for the MIMO radar sensor of FIG. 2.
Figure 5:
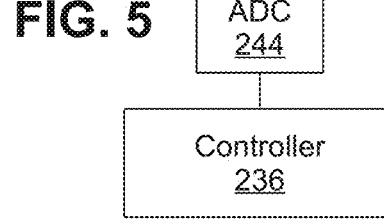
FIG. 5 illustrates an example receiver channel for the MIMO radar sensor of FIG. 2.

Now turning to FIGS. 4 and 5, these figures respectively illustrate example transmit and receive channels or paths for individual transmit and receive antennas 206A, 206B, 208A, 208B in transceiver 202A (it being understood that similar components may be used for other transceivers such as transceiver 202B). While the techniques described herein may be applicable to pulse modulated radar sensors or any other types of radar sensors, the illustrated implementations will focus on MIMO radar sensors that utilize millimeter wave frequency modulated continuous wave (FMCW) radar signals.

In the transmit channel of transceiver 202A as illustrated in FIG. 4, a local oscillator (LO) 230 generates an FMCW radio frequency (RF) signal, e.g., in the range of 76 GHz to 81 GHz. The FMCW RF signal is amplified by an amplifier 232 to drive a transmit antenna 206A. The frequency of LO 230 is determined by a modulator block 234, which is capable of frequency modulating LO 230 to effectively generate pulsed signals or sweep signals referred to as chirps, e.g., using sawtooth or another form of frequency modulation. Control over modulator block 234 may be provided by a controller 236, which in some instances may be controller 204, while in other instances may be other control logic, e.g., as may be integrated into transceiver 202A. Controller 236 may be used to control various parameters of the chirps, e.g., start frequency, phase, chirp rate, etc., as well as to trigger the initiation of a chirp.

In the receive channel of transceiver 202A as illustrated in FIG. 5, a received RF signal from an antenna 208A is amplified by an amplifier 238 and then mixed with the LO 230 signal by a mixer 240 to generate a mixed signal. The mixed signal is filtered by a filter 242 and digitized by an analog to digital converter (ADC) 244 to generate a stream of digital signals. For example, the digital signals can be data samples, which in the illustrated implementation may be considered to be digital values output by ADC 244, and which may in some implementations include other identifying data such as the channel, transmit antenna, receive antenna, chirp number, timestamp, etc. associated with the digital value. The digital signals are provided to controller 236.

It will be appreciated that in different implementations, various components among components 230-244 of FIGS. 4 and 5 may be shared by multiple transmit channels or multiple receive channels and that multiple instances of some components may be dedicated to different channels. Further, other architectures may be used to implement transmit channels or receive channels in other implementations, so the invention is not limited to the specific architecture illustrated in FIGS. 4-5. In addition, in some implementations, controller 236 may be replaced by controller 204 of radar sensor 200. In these implementations, controller 204 of radar sensor 200 may control one or more components of components 230-244 described with reference to FIGS. 4 and 5.

Figure 6:
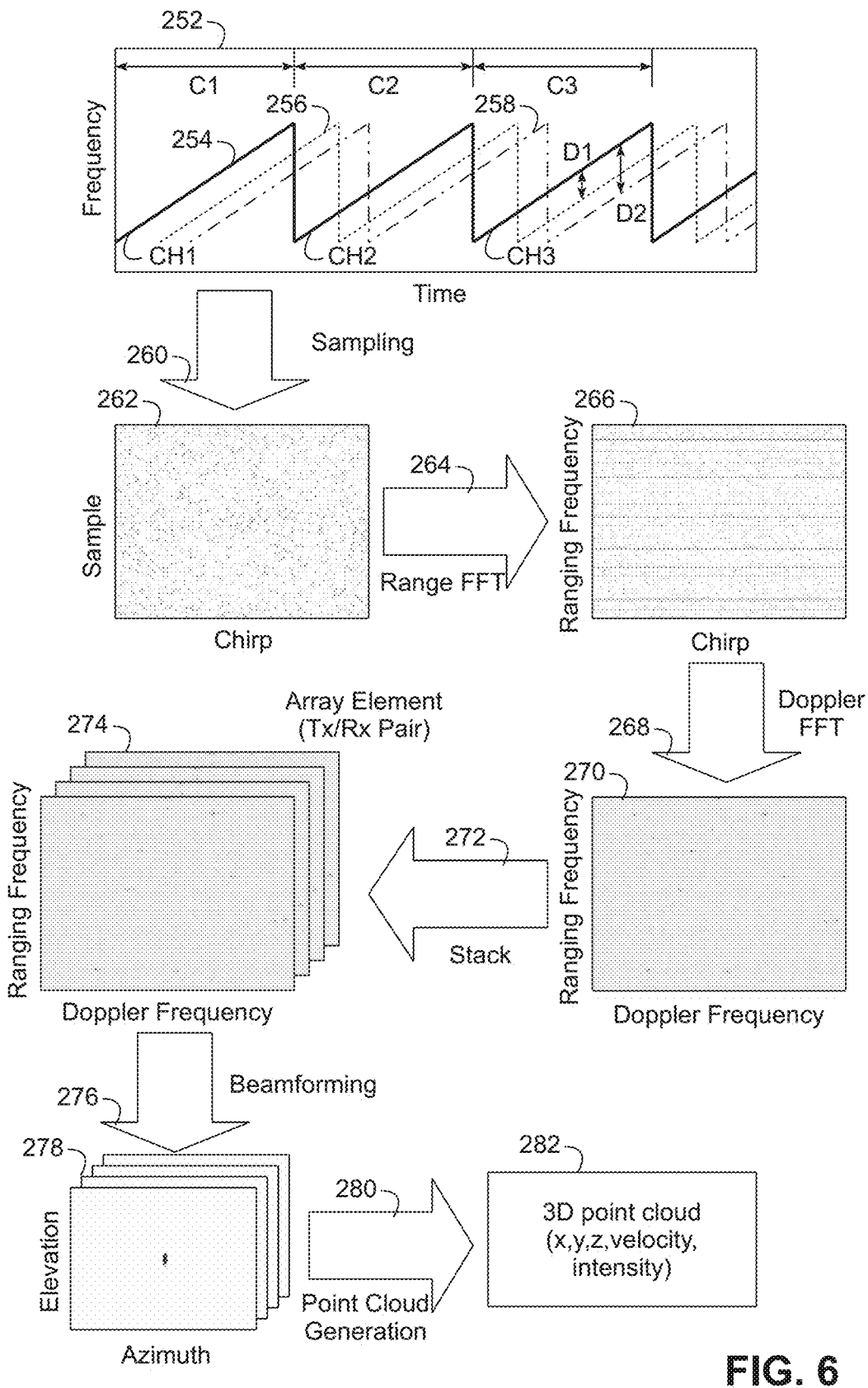
FIG. 6 illustrates an example process for sensing targets in an environment with various implementations disclosed herein.

FIG. 6 next illustrates diagrams showing general operations of a radar sensor and data generated by the radar sensor. For example, the radar sensor may be an FMCW MIMO radar sensor such as radar sensor 200 discussed above in connection with FIGS. 2-5. Graph 252, for example, illustrates a simplified time vs. frequency graph of a sequence of chirps. A chirp may represent a sweeping signal across frequency in a certain cycle. For example, a chirp CH1 is a sweeping signal during cycle C1, a chirp CH2 is a sweeping signal during cycle C2, and a chirp CH3 is a sweeping signal during cycle C3. In this example, chirps CH1-CH3 are illustrated as repetitions of sweeping signals having the same shape. However, in some implementations, chirps may dwindle over time. In addition, in this example graph, chirps C1-C3 are linearly modulated to have a sawtooth shape. However, in some implementations, the chirps may be modulated non-linearly or may be modulated to have any shape. Graph 252 shows both a transmitted signal 254 (which matches the frequency of the local oscillator) for a transmit channel Tx and received signals 256, 258 for two targets located at difference ranges and received by a receive channel Rx. In this example, the transmitted signal 254 represents a sequence of chirps. As shown in this graph, the time delay from transmission of the transmit signal to being received for the two targets causes a difference in frequency, e.g., illustrated by D1 for a first target and D2 for a second target.

In some implementations, data samples collected by radar sensor 200 may be processed to generate radar data associated with certain features. For example, the radar data may be represented as data cubes associated with certain features. The features may be represented as dimensions of the data cubes where the features include, but are not limited to, fast time (the number of samples in one chirp), slow time (the number of chirps in one set of chirps), and the number of receive channels. Where a local oscillator is operated at about 77 GHz, a controller (e.g., controller 204 in FIG. 2 or controller 236 in FIGS. 4 and 5) may process received data samples such that each frame may include 128-512 chirps and 512-1024 samples per chirp. In this example, a frame firing duration (also referred to as a coherent processing interval (CPI) may be about 5-15 ms/frame, a sample rate may be about 20 million samples/second, and a chirp duration may be about 25-100 microseconds per chirp. In some implementations, receive channels (e.g., about 4-16 Rx channels) may be processed in parallel. Although specific numbers are provided in this paragraph, they are provided as examples and any suitable numbers can be used to implement radar sensors.

Radar data (e.g., data cubes) may be processed to determine, for one or more targets in the field of view of a radar sensor, (i) range from the radar sensor to a respective target, (ii) Doppler velocity (i.e., radial velocity of the respective target relative to the radar sensor), or (iii) angle of arrival, in terms of one or both of azimuth and elevation. First, as illustrated at 260, sampling may be performed on each receive channel over multiple chirps in a frame or CPI. The samples for all of the chirps in the frame for a particular Tx/Rx pair may be incorporated into a two dimensional array 262 where the samples are arranged in one dimension by sample number (vertical axis of FIG. 6, from first sample to last sample collected for each chirp) and in another dimension by chirp number (horizontal axis of FIG. 6, from first chirp to last chirp in a frame). In one example implementation, for example, where a frame includes 128 chirps with 1024 samples in each chirp, the array may have dimensions of 128 (horizontal)×1024 (vertical).

Next, range measurements are determined for the samples in each channel, generally by performing a Fast Fourier Transform (FFT) operation 264 (referred to herein as a range FFT), or other frequency transformation, which recovers the frequency spectrum from the digital samples in each channel to generate a range profile (power vs. range) in the frequency domain for each chirp for a particular Tx/Rx pair. It will be appreciated, in particular, that a target at a given range from a radar sensor will delay the transmitted signal 254 by a delay that is proportional to its range, and that this delay remains substantially constant over a chirp. Given that the mixed signal output by mixer 240 of FIG. 5 is effectively the difference in the instantaneous frequencies of the transmitted and received signals within a given channel, and that this difference is substantially constant over a chirp, the reflection corresponding to the target effectively generates a constant frequency "tone" in the mixed signal that resolves to a peak in the frequency domain at that frequency. Multiple targets therefore resolve to a range profile having different peaks in the frequency domain corresponding to the ranges of those targets, and may be grouped in some implementations into frequency bins corresponding to different ranges in the field of view of the radar sensor.

Each range profile for a particular chirp may be considered to be a one dimensional array representing power over a range of frequencies for that chirp. The range profiles for the chirps in the frame may therefore also be stacked into an array 266 having one dimension representing ranging frequency or frequency bin (vertical axis in FIG. 6) and one dimension representing chirp number (horizontal axis in FIG. 6), and it may be seen by the representation of array 266 that horizontal lines generally represent frequency bins where potential targets at various ranges corresponding to those frequency bins have been detected over the course of multiple chirps in a frame.

Next, velocity measurements (e.g., Doppler measurements) are determined for the samples in each channel, generally by performing a second FFT operation 268 (referred to herein as a Doppler FFT) to recover phase information corresponding to Doppler shifts. Transforming across the set of chirps results in a data set that may be represented by an array 270 arranged by ranging frequency or frequency bin (vertical axis) and Doppler frequency or frequency bin (horizontal axis), where each Doppler frequency bin generally corresponds to a particular velocity for a potential target disposed within a particular range frequency bin.

Next, beamforming is performed to determine angle of arrival information. It should be noted that arrays 262, 266 and 270 are each based on the samples for a single transmit channel/receive channel (Tx/Rx) pair. Thus, a stacking operation 272 may be performed to stack the arrays 270 generated by the Doppler FFT operation for different Tx/Rx pairs (also referred to as array elements) into a data stack 274.

It will be appreciated that each different Tx/Rx pair may have a different spatial relationship between the respective physical transmit and receive antennas for the pair, which can lead to slightly different phases reported for the same target for different Tx/Rx pairs. In the case of a uniform linear array, a third FFT operation 276 (referred to herein as a beamforming FFT) may therefore use the set of values across the different array elements in stack 274 (also referred as a beamvector) to estimate an angle of arrival at each range-Doppler location (i.e., each combination of range frequency bin and Doppler frequency bin). More generally, a set of complex responses expected for some set of azimuth and elevation angles of arrival, also known as steering vectors, may be multiplied onto the beamvectors to generate azimuth and elevation angles for each target (represented by graphs 278).

Then, the aforementioned range, Doppler and angle of arrival information may be combined in some implementations by a point cloud generation operation 280 into a three dimensional point cloud 282 including estimated position (e.g., using cartesian or polar coordinates), velocity, and signal intensity (or confidence) for a plurality of targets in the field of view of the radar sensor.

It will be appreciated that a wide variety of modifications and enhancements may be made to the aforementioned operations of FIG. 6, so the invention is not limited to this specific sequence of operations.

Those skilled in the art, having the benefit of the present disclosure, will recognize that the exemplary environment illustrated in FIGS. 1-6 is not intended to limit implementations disclosed herein. Indeed, those skilled in the art will recognize that other alternative hardware or software environments may be used without departing from the scope of implementations disclosed herein. It will also be appreciated that the various MIMO radar techniques described herein may be utilized in connection with other applications, so the invention is not limited to MIMO radars or radar sensing systems used solely in connection with the control of an autonomous vehicle.

Virtual Antenna Array With Distributed Aperture

Figure 7:
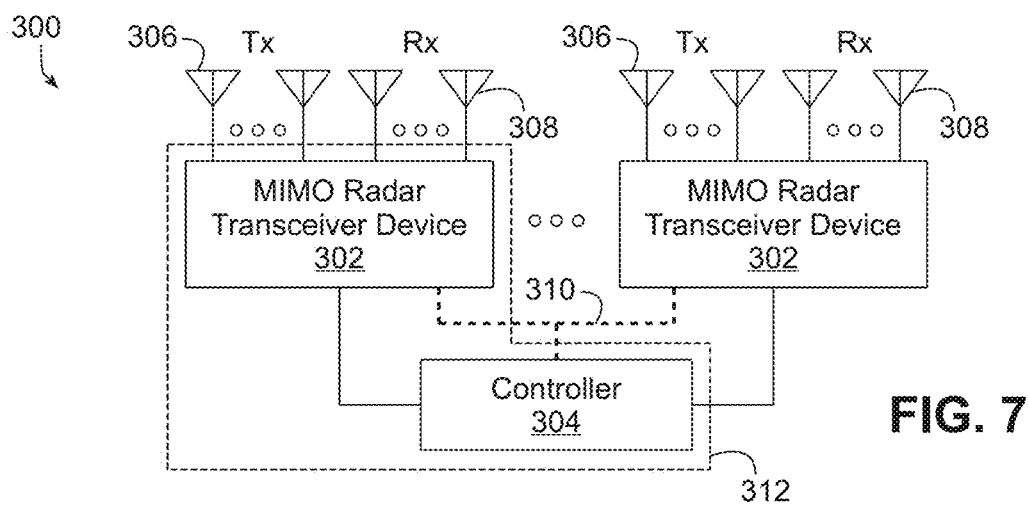
FIG. 7 illustrates an example implementation of a MIMO radar system utilizing a virtual antenna array with distributed aperture consistent with some aspects of the invention.

Now turning to FIG. 7, it may be desirable in some implementations to utilize a virtual antenna array with distributed aperture radar sensor that synthesizes a virtual antenna array where at least a subset of the transmit antennas and receive antennas forming the virtual antenna array are disposed in different local oscillator domains. Specifically, FIG. 7 illustrates a MIMO radar system 300 including a plurality of MIMO radar transceiver devices 302 operably coupled to one another by a controller 304. Each MIMO radar transceiver device 302 may be implemented as a MIMO transceiver integrated circuit chip or package having one or more transmit (Tx) antennas 306 and one or more receive (Rx) antennas 308, and unless specified otherwise, it will be appreciated that the term transceiver device will be used to refer to a transceiver disposed on one or more integrated circuit devices or chips, whether or not incorporated into a common package or module, and whether or not having antennas integrated directly therewith.

In some implementations, for example, each MIMO radar transceiver device 302 may be implemented as an antenna on package (AOP) chip, whereby antennas 306, 308 are implemented as patch antennas integrated onto a surface of MIMO radar transceiver device 302. It will be appreciated that antennas 306, 308 may be integrated into the surface of a chip itself or to packaging for the chip, e.g., in a module that integrates one or more chips and supporting circuitry into a package. For the purposes of this disclosure, therefore, unless specified that antennas are integrated directly onto the surface of a transceiver integrated circuit chip, the term antenna on package (AOP) may be considered to include any design where antennas are integrated directly onto the surfaces of one or more transceiver integrated circuit chips or where antennas are integrated onto a package or module including one or more transceiver integrated circuit chips integrated into such a package or module.

AOP designs have been used to simplify the design of short range radar sensors, particularly those used in applications having lower resolution automotive applications such as foot-activated tailgates, adaptive cruise control, lane change assist, and other driver assistance applications. However, it has been found that such designs typically lack suitable angular resolution for higher resolution applications, and often include angular resolutions in the range of 30 degrees or more, which while sufficient for lower resolution automotive applications, are generally insufficient for longer range or higher resolution applications such as imaging radar sensors. It would be desirable, for example, for an imaging radar sensor to have one or more of the following performance characteristics: a range resolution of at least about 5 cm to about 25 cm, an angular field of view with an azimuth and elevation of about +/−30 degrees to about +/−75 degrees, an angular resolution of about 1 degree to about 4 degrees, an angular accuracy about 0.2 degrees to about 0.8 degrees, and a range of about 20 meters to about 40 meters.

Angular resolution generally improves in a MIMO radar system as the number of antennas or array elements increases; however, individual transceiver devices are inherently limited in the number of antennas or array elements that can be supported by a given transceiver device. Increased angular resolution generally requires that multiple transceiver devices be interfaced with one another to effectively fuse the apertures of the multiple transceiver devices and effectively increase the overall count of antennas or array elements in the overall system. Conventionally, coherently fusing the apertures from multiple transceiver devices, e.g., in cascaded radar systems, generally requires the use of a common Local Oscillator (LO) signal shared across all the transmitters and receivers in the entire cascaded system, whereby each of the transmitters and receivers is considered to be within the same local oscillator domain. A master module in such a system generally controls the radar chirp/frame timing for all of the devices, chips, packages and modules in the system by generating a digital synchronization signal and sharing this synchronization signal with other, slave radar modules. The master module also generally is required to generate the LO signal and share it with the slave modules to ensure that the entire system operates from a single LO signal. It has been found, however, that such synchronization is expensive and difficult to achieve, particularly when trying to generate a large (e.g., greater than 10 cm) synchronized aperture. Given that in many automotive applications, LO signals of 20+ GHz are used, sharing such high frequency signals across different chips, different devices, different packages or different hardware modules is ordinarily unachievable without the use of specialized and expensive circuit boards and materials.

In the illustrated implementations, however, virtual antenna arrays may be synthesized between transmitters and receivers disposed in different local oscillator domains. In particular, in some implementations a virtual antenna array with a distributed aperture may be synthesized using the plurality of MIMO radar transceiver devices, with the virtual antenna array defining at least a first set of virtual array elements defined by one or more pairs of transmitters and receivers from the same local oscillator domain and a second set of virtual array elements defined by one or more pairs of transmitters and receivers from different local oscillator domains. Put another way, the virtual array elements in the second set are each defined by a transmitter that operates using the local oscillator signal of one local oscillator domain and a receiver that operates using the local oscillator signal of another, different local oscillator domain.

In some implementations, for example, transmitters and receivers disposed on multiple MIMO radar transceiver devices such as AOP chips may be used to synthesize a virtual antenna array having improved angular resolution and sidelobe performance that could otherwise be obtained by the individual AOP chips, and without the need for a single high frequency LO source shared between the AOP chips. The herein-described techniques, in particular, may be used to compensate for timing or phase mismatches between the chirps on individual AOP chips, and in some instances, the techniques may account for the effects of phase noise between the oscillators on different AOP chips. Among other benefits, some implementations may employ an array of AOP chips that form a virtual antenna array with a distributed aperture having sufficient performance characteristics for higher resolution radar applications such as automotive imaging radar sensors.

A local oscillator domain for the purposes of this disclosure may therefore be considered to be any transmitter, receiver, or transceiver circuitry that shares a given local oscillator signal, such that any other transmitter, receiver or transceiver circuitry that utilizes a different local oscillator signal is considered to be external from such a local oscillator domain, as well as disposed within a different local oscillator domain. It will be appreciated, however, that while certain circuitry may be considered to be external from a particular local oscillator domain, that circuitry is not required to be entirely isolated from other circuitry considered to be within that local oscillator domain, as other signals may be shared by or otherwise communicated between different local oscillator domains, including, for example, lower frequency clock or oscillator reference signals (e.g., in the MHz frequency spectrum rather than the GHz frequency spectrum), synchronization signals, trigger signals, etc. For example, with some AOP chips, a lower frequency reference oscillator clock with a frequency in the range of about 40 MHz may be shared by multiple AOP chips, and used by the PLLs in each chip to generate an RF local oscillator clock signal of 20 GHz or higher and a digital clock signal of about 1 GHz for the logic circuitry in each AOP chip. In such a configuration, however, the AOP chips would be considered to be in separate local oscillator domains given the lack of sharing of any local oscillator signal therebetween.

It will also be appreciated that the manner in which a local oscillator domain may be defined may vary in different implementations. A local oscillator domain in some implementations may be associated with one or more MIMO radar transceiver devices, each of which including one or more integrated circuit chips, packages or modules, and each including one or more transmitters and one or more receivers that share a common local oscillator signal. However, in some instances multiple local oscillator domains or multiple MIMO radar transceiver devices may be resident on the same integrated circuit chip, so long as the transmitter(s) and receiver(s) thereof utilize separate local oscillator signals.

FIG. 7, for example, illustrates separate MIMO radar transceiver devices 302 that operate in and are disposed within different and separate local oscillator domains, as each includes its own local oscillator that is not shared with any other MIMO radar transceiver device 302. Nonetheless, FIG. 7 also illustrates a trigger signal 310 that is generated by controller 304 and communicated to each of the MIMO radar transceiver devices 302 to trigger the initiation of a chirp on each transmitter and sampling by analog to digital converter logic. Of note, controller 304 may be in the same local oscillator domain as one of MIMO radar transceiver devices 302 in some implementations, e.g., being integrated into the same integrated circuit chip or package (as illustrated at 312), or may be external from any or all of MIMO radar transceiver devices 302 in other implementations. In some implementations, controller 304 may be separate from radar sensor 300, and, for example, integrated into a vehicle control system or other external control system. Therefore, the invention is not limited to use of a controller that is disposed within the same local oscillator domain as one or more MIMO radar transceiver devices in a radar sensor. In addition, as noted above, MIMO radar transceiver devices 302 and controller 304 may share other communication links in other implementations. Some commercially-available AOP chips, for example, include trigger pins or inputs that trigger or initiate chirps, but do not otherwise support cascadability, i.e., are non-cascadable devices.

Figure 8:
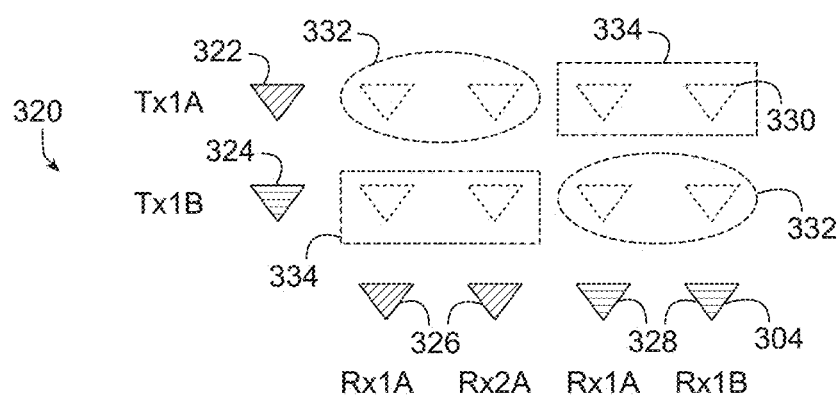
FIG. 8 illustrates an example virtual antenna array capable of being produced by the MIMO radar system of FIG. 7.

Antennas 306, 308 of radar sensor 300 may form a virtual antenna array. To simplify the explanation of a virtual antenna array, FIG. 8 illustrates an example simplified virtual antenna array 320 formed of two AOP chips (designated as AOP chip A and AOP chip B), each having one transmit antenna (Tx1A antenna 322 for AOP chip A and Tx1B antenna 324 for AOP chip B) and two receive antennas (Rx1A and Rx2A antennas 326 for AOP chip A and Rx1B and Rx2B antennas 328 for AOP chip B), which forms a 2×4 virtual antenna array. It will be appreciated that this virtual antenna array defines eight transmit receive (Tx/Rx) channels represented by virtual antennas or array elements 330. It will also be appreciated that for Tx/Rx channels defined by transmitters and receivers disposed on the same AOP chip (represented by on-chip sub-arrays 332), these on-chip Tx/Rx channels may be considered to be within and operate using the same local oscillator domain, while for Tx/Rx channels defined by transmitters and receivers disposed on different AOP chips (represented by cross-chip sub-arrays 334), these cross-chip Tx/Rx channels may be considered to span or operate using different local oscillator domains. A sub-array, in this regard, may be considered to incorporate one or more Tx/Rx channels, each formed by a unique combination of a transmitter and a receiver, and each representing a virtual array element or antenna in a virtual antenna array.

In the illustrated implementation, the virtual antenna array 320 may be used to effectively synthesize a distributed aperture for the virtual antenna array providing improved angular resolution and range over the virtual antenna array defined by each individual AOP chip. Further, in some implementations, phase differences between different AOP chips may be identified and compensated for.

It will be appreciated that, for a MIMO radar system, the initial phase from each FMCW (frequency modulated continuous waveform) chirp will generally be a random and uncontrollable value, so an assumption may be made that all of the transmitters and receivers involved in creating a single virtual array aperture are all sharing the same RF local oscillator clock. Therefore, all of the transmitters and receivers on the same AOP chip or other MIMO radar transceiver device generally share the same phase variations. This is illustrated by equations (1)-(4) below:

$$x_{tx}(t) = A\exp(j2\pi(f_c(nT+t_s)+0.5*\alpha t_s^2+\varphi_0)) \quad (1)$$

$$x_{rx}(t) = B\exp(j2\pi(f_c(nT+t_s-\tau)+0.5*\alpha(t_s-\tau)^2+\varphi_0)) \quad (2)$$

$$\tau = 2(R+vt)/c = 2(R+v(nT+ts))/c \quad (3)$$

-continued $$\begin{aligned}x_m(t) &= x_{tx}(t)*conj(x_{rx}(t)) \quad (4)\\
&= AB/2*\exp(j2\pi(f_c(nT+t_s)+0.5*\alpha t_s^2 - \\
&\quad f_c(nT+t_s-\tau)-0.5*\alpha(t_s-\tau)^2))\\
&= AB/2*\exp(j2\pi(f_c\tau+\alpha\tau t_s-0.5*\alpha*\tau^2))\\
&\Box\ AB/2*\exp\left(j2\pi\left(\frac{2*\alpha*R}{c}+\frac{2*fc*v}{c}+\right.\right.\\
&\quad \left.\frac{2*\alpha*v*n*T}{c}\right)t_s+\left(\frac{2*fc*v}{c}\right)nT+\frac{2*fc*R}{c}+\\
&\quad \left.\left.\frac{2*\alpha*v*ts*ts}{c}\right)\right)\end{aligned}$$

where $X_{tx}(t)$ is the transmitted FMCW signal with frequency slope of $\alpha$ and center carrier frequency of $f_c$, $X_{rx}(t)$ is the received signal, which is taken as an attenuated and delayed (by $\tau$ in the above formula) duplicate of the transmitted signal, and $X_m(t)$ is the beat signal after mixing $X_{tx}(t)$ and $X_{rx}(t)$. The target is assumed to be located at distance of R and moving at a relative speed of v. The initial phase of the first chirp, $\varphi_0$, although random, will be cancelled in the de-chirping operations.

However, where different MIMO radar transceiver devices forming a virtual antenna array do not have the same RF local oscillator available to cascade all of the MIMO radar transceiver devices, e.g., as a result of the MIMO radar transceiver devices being non-cascadable, there is no guarantee that all the MIMO radar transceiver devices will have the same phase relationships along the chirps, and can vary based upon how well the PLLs match each other in both the design and manufacturing process (assuming the same lower frequency clock or oscillator reference signal is applied to all of the MIMO radar transceiver devices). It has been found, however, that in some commercially-available AOP chips, phase variations of this sort may in practice be less than about 45 degrees, which can still provide sufficient coherence for beamforming and create a single distributed and virtual aperture even without extra phase calibration steps to cancel phase variations between the AOP chips. In other implementations, however, phase calibration may be performed to make beamforming calculation more accurate, as will be discussed in greater detail below in connection with FIG. 12.

Figure 9:
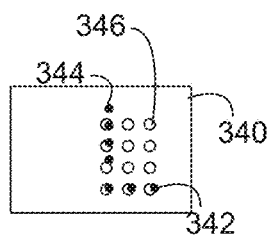
FIG. 9 illustrates an example single AOP antenna array and resulting beam pattern formed thereby.
Figure 9:
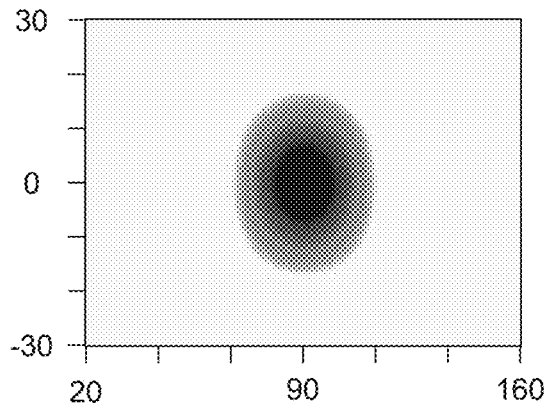

In some implementations, the relative arrangement of MIMO radar transceiver devices and antennas on a common circuit board, package or module may also be selected to optimize angular resolution and sidelobe performance. FIG. 9, for example, illustrates a single example MIMO radar transceiver device implemented as an AOP chip 340 including three transmit antennas 342 and four receive antennas 344 forming a 12 (3×4) virtual antenna array 346 and positioned in the specific locations illustrated in the figure on the top surface of the chip package to define an antenna layout for the AOP chip. The figure also illustrates to the right a representative beampattern generated by the single virtual antenna array, and illustrates the relatively coarse angular resolution provided thereby.

Figure 10:
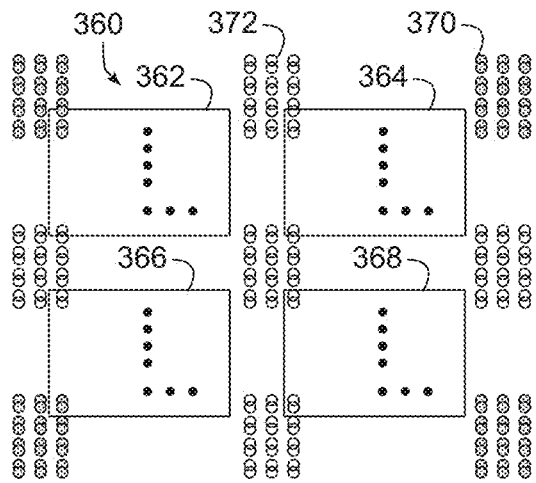
FIG. 10 illustrates an example 2×2 AOP antenna array and resulting beam pattern formed thereby.
Figure 10:
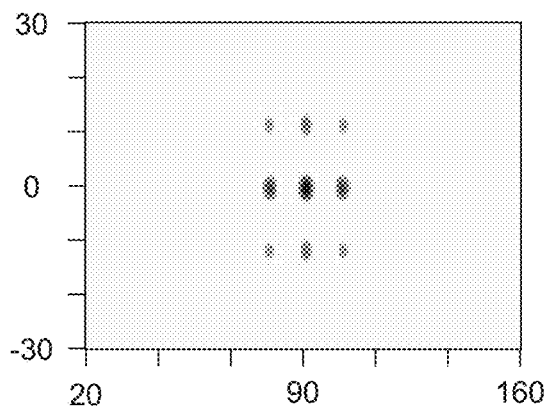

FIG. 10, in turn, illustrates a 2×2, 4-chip array 360 including four AOP chips 362, 364, 366, and 368, each of which configured and oriented in a similar rotational orientation to AOP chip 340 of FIG. 9 and having the same antenna layout. Considering the fixed number of channels the AOP chips can provide and the fixed locations of the transmit and receive antennas on any given AOP chip; however, increases in aperture size leads to relatively large gaps in between the channels, thereby leading to degraded sidelobe rejection. In particular, on-chip sub-arrays 370, which are generated by the on-chip Tx/Rx pairs for each AOP chip and are positioned at the four corners of the array are supplemented by cross-chip sub-arrays 372, which in many instances overlap with one another or with the on-chip sub-arrays 370, leaving relatively large gaps between the channels as illustrated in the representative beampattern at the right of FIG. 10.

Figure 11:
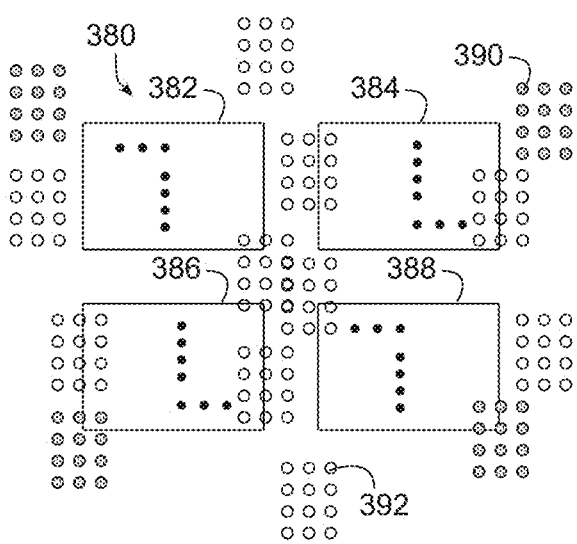
FIG. 11 illustrates another example 2×2 AOP antenna array and resulting beam pattern formed thereby, where two of the AOP devices are rotated.
Figure 11:
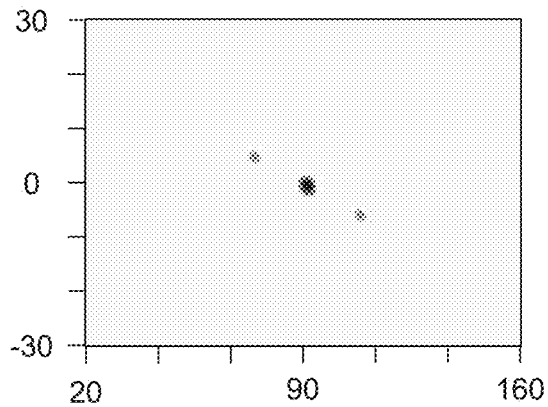

On the other hand, in order to reduce overlap and create the most unique virtual channels within a given package size, one or more of the AOP chips may be rotated to effectively change the orientation of the transmit and receive antennas on the AOP chips. FIG. 11, in particular, illustrates a 2×2, 4-chip array 380 including four AOP chips 382, 384, 386, and 388, each of which configured in a manner to AOP chip 340 of FIG. 9, but with AOP chips 382 and 388 (representing the upper left and lower right positions) rotated 180 degrees relative to AOP chips 384 and 386 (representing the upper right and lower left positions). In some implementations, other rotational orientations or other combinations of rotated and non-rotated AOP chips may be used; however, in the illustrated implementation, 180 degree rotation enables all four AOP chips to work on the same polarization. It will be appreciated that in other implementations other polarimetric layouts may be used.

It will be appreciated from FIG. 11 that with two of the four AOP chips rotated, the number of unique and non-overlapping virtual sub-arrays is increased, as the on-chip sub-arrays 390 are supplemented by numerous distributed cross-chip sub-arrays 392. As depicted at the right of FIG. 11, this arrangement leads to a beampattern having greater angular resolution and improved sidelobe performance compared to either of the beampatterns of FIGS. 9 and 10.

It will also be appreciated that, in order to simplify the computations for beamforming, it may be desirable in some implementations to set the AOP chip layout on the circuit board such that all virtual antenna array locations are on a grid of multiples of lambda/2. Such an arrangement generally allows beamforming to be computed efficiently by FFT, instead of much more computationally-expensive discrete Fourier transform (DFT) (i.e., custom steering vectors), although DFT may be used in other implementations.

Figure 12:
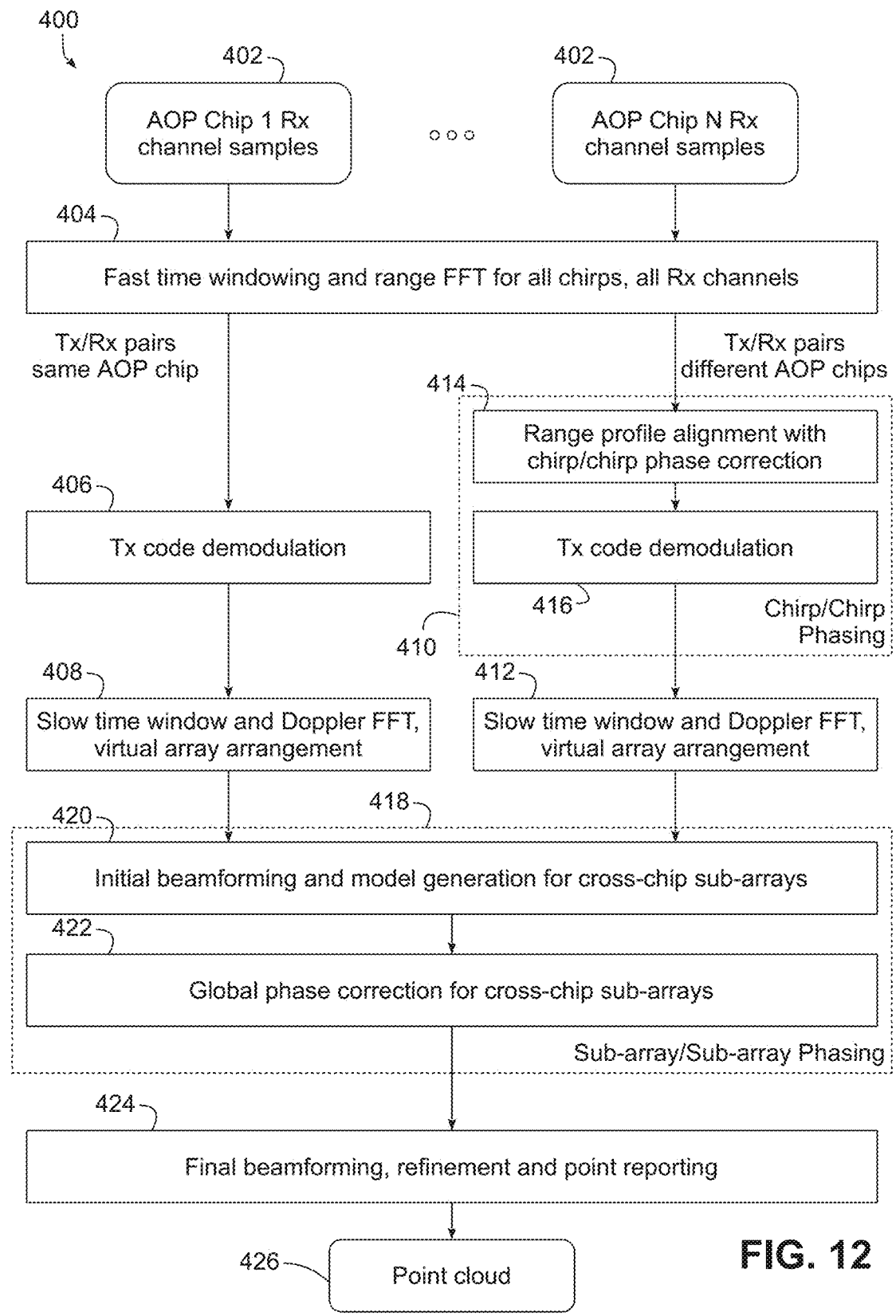
FIG. 12 illustrates an example implementation of a method for sensing objects in an environment using the MIMO radar system of FIG. 7.

Now turning to FIG. 12, this figure illustrates an example sequence of operations 400 for sensing objects in an environment using a virtual antenna array with distributed aperture radar system such as radar system 300 of FIG. 7, which may be implemented in controller 304 thereof. As shown in blocks 402, each MIMO radar transceiver device, e.g., AOP chips 1 . . . N, may provide, e.g., Rx channel samples for each chirp triggered by controller 304, which may then be processed in block 404 by performing fast time windowing and range transformation operation (e.g., a range FFT) for all chirps and for all Rx channels, e.g., in a similar manner to that described above for operation 264 of FIG. 6.

In some implementations, it may be desirable to perform Tx code demodulation, slow time windowing and Doppler FFT for all Tx/Rx pairs in a similar manner for all Tx/Rx pairs and regardless of whether the Tx/Rx pairs are on-chip or cross-chip Tx/Rx pairs. In the illustrated implementation of FIG. 12, however, it may be desirable instead to perform additional phase correction for cross-chip Tx/Rx pairs. Thus, for on-chip Tx/Rx pairs, blocks 406 and 408 may perform transmitter (Tx) code demodulation (e.g., using Doppler codes, pseudo-random codes, or other suitable code-based modulation schemes) and slow time windowing and Doppler transformation (e.g., Doppler FFT) operations similar to those described above in connection with operation 268 of FIG. 6, while for cross-chip Tx/Rx pairs a chirp/chirp phasing operation in block 410 may be performed prior to performing slow time windowing and Doppler FFT in block 412.

Chirp/chirp phasing in block 410 may incorporate in some implementations a range profile alignment that applies chirp/chirp phase correction (block 414) prior to performing Tx code demodulation (block 416). It has been found, in particular, that particularly where MIMO radar transceiver devices such as AOP chips operate on independent clock or reference sources, a mismatch between chip/pulse repetition time can introduce an increasing time delay between chirp starts that results in "sliding" of the frequency difference between chirps, and hence a common-mode frequency shift for all targets in a scene for any given chirp. Thus, it may be desirable to perform range profile alignment and then compensating the phase progression across chirps for one or more strong targets and apply that correction across all Rx channels, thereby preserving the phase relationships of the individual Rx channels.

Next, while in some implementations the random phase relationships between virtual array elements on different transceiver may not require compensation, in the illustrated implementation sub-array/sub-array phasing (block 418) may be performed to compensate for such phase relationships. Block 418 may be implemented, for example, by performing initial beamforming and model generation for cross-chip sub-arrays in block 420 and then applying global phase correction for the cross-chip sub-arrays in block 422.

While other approaches may be used in other implementations, in the illustrated implementation block 420 may identify a set of one or more correlated points, i.e., points identified by at least two of the different Tx/Rx channels in different sub-arrays that with at least some confidence are considered to be associated with the same real world object. The correlated points may be identified in some implementations using a nearest neighbor spatial matching algorithm, and in some implementations, the spatial matching may be based on range, Doppler and angle correspondence, although in other implementations other factors, e.g., intensity, may also be considered, while in other implementations, spatial matching may only be based on a subset of such factors. Further, in some implementations, points may be weighted based upon intensity or field of view, e.g., to prioritize points that are more intense or have higher confidences or are closer to the center of the field of view or to ignore points that are less intense, are of lower confidence or are positioned more towards the periphery of the field of view. Then, one or more points from the set of correlated points may be used along with an ideal array geometry for one of the MIMO radar transceiver devices to create a set of ideal beamvectors, e.g., based upon a known relative position of each antenna in each MIMO radar transceiver device. Then, a phase correction may be derived and applied in block 422 to compensate for temporal or spatial sub-array mismatches through a comparison between the set of ideal beamvectors and the actual beamvectors for each sub-array.

Next, in block 424 the final beamforming process (e.g., a beamforming FFT operation) may be performed, and one or more reported points may be refined (i.e., such that the concatenated array improves the positional accuracy of the positional information for a point) or one or more additional points may be determined (i.e., such that the concatenated array identifies one or more points that were not identified by one or more of the sub-arrays). An example of the former improvement is one in which the angle of arrival for a point is refined to a more accurate position, while an example of the latter improvement is one in which points that were determined to be the same target from multiple sub-arrays are instead determined to be for different targets having different corresponding angles of arrival. As such, a point cloud (or other suitable radar output format) including the refined or additional points may be reported by block 424.

Thus, a combined point cloud (or other suitable radar output) 426 may be reported by radar sensor 300, representing the target(s) collectively sensed by the virtual antenna array with distributed aperture, and generally with enhanced angular resolution, enhanced detection range and enhanced signal-to-noise ratio as compared to each individual MIMO radar transceiver device 302.

Other variations will be apparent to those of ordinary skill. Therefore, the invention lies in the claims hereinafter appended.

What is claimed is:

1. A radar sensor, comprising:
a plurality of multiple input multiple output (MIMO) radar transceiver devices, each including a plurality of transmitters and a plurality of receivers disposed within a local oscillator domain; and
control logic coupled to the plurality of MIMO radar transceiver devices and configured to synthesize a virtual antenna array with a distributed aperture using the plurality of MIMO radar transceiver devices, the virtual antenna array including a first set of virtual array elements defined by one or more pairs of transmitters and receivers from the same local oscillator domain and a second set of virtual array elements defined by one or more pairs of transmitters and receivers from different local oscillator domains;
wherein each MIMO radar transceiver device comprises an antenna-on-package device including a transmit antenna for each transmitter and a receive antenna for each receiver in the respective MIMO radar transceiver device, wherein the MIMO radar transceiver devices have a same antenna layout for the transmit and receive antennas thereon and are disposed on a common circuit board, wherein the plurality of MIMO radar transceiver devices includes first, second, third and fourth MIMO radar transceiver devices respectively arranged in upper left, upper right, lower right and lower left positions of a two-by-two array, wherein the second and fourth MIMO radar transceiver devices are each mounted on the circuit board in a same rotational orientation relative to one another, and wherein the first and third MIMO radar transceiver devices are each mounted on the circuit board at about a 180 degree rotational orientation relative to the second and fourth MIMO radar transceiver devices.

2. The radar sensor of claim 1, wherein the MIMO radar transceiver devices are arranged on the circuit board with lambda/2 spacing.

3. The radar sensor of claim 1, wherein the MIMO radar transceiver devices are non-cascadable transceiver devices.

4. The radar sensor of claim 1, wherein the control logic is configured to trigger frequency modulated continuous wave (FMCW) chirps one or more of the MIMO radar transceiver devices using a trigger input thereon.

5. The radar sensor of claim 1, wherein the control logic is configured to apply a global phase correction for the one or more pairs of transmitters and receivers in the second set of virtual array elements.

6. The radar sensor of claim 5, wherein the control logic is configured to apply the global phase correction for the one or more pairs of transmitters and receivers in the second set of virtual array elements after performing a Doppler transformation operation for the one or more pairs of transmitters and receivers in the second set of virtual array elements.

7. The radar sensor of claim 5, wherein the control logic is configured to apply the global phase correction by:
performing initial beamforming to generate a set of initial beamvectors;
identifying one or more correlated points from one or more pairs of transmitters and receivers in at least one of the first and second sets of virtual array elements;
generating a set of ideal beamvectors for at least one of the MIMO radar transceiver devices; and
generating the global phase correction by comparing the set of ideal beamvectors to the set of initial beamvectors.

8. The radar sensor of claim 1, wherein the control logic is configured to align range profiles for the one or more pairs of transmitters and receivers in the second set of virtual array elements.

9. The radar sensor of claim 8, wherein the control logic is configured to align the range profiles for the one or more pairs of transmitters and receivers in the second set of virtual array elements after performing a range transformation operation for the for the one or more pairs of transmitters and receivers in the second set of virtual array elements, and to perform transmitter code demodulation for the one or more pairs of transmitters and receivers in the second set of virtual array elements after aligning the range profiles for the one or more pairs of transmitters and receivers in the second set of virtual array elements.

10. The radar sensor of claim 1, further comprising a plurality of local oscillator domains, wherein each of the plurality of MIMO radar transceiver devices is disposed within a local oscillator domain among the plurality of local oscillator domains such that any MIMO radar transceiver devices disposed within the same local oscillator domain operate using a common local oscillator signal, and any MIMO-radar transceiver devices disposed within different local oscillator domains operate using separate local oscillator signals.

11. A method, comprising:
receiving radar data from a plurality of multiple input multiple output (MIMO) radar transceiver devices, each including one or more transmitters and one or more receivers disposed within a local oscillator domain; and
synthesizing a virtual antenna array with a distributed aperture using the radar data received from the plurality of MIMO radar transceiver devices, the virtual antenna array including a first set of virtual array elements defined by one or more pairs of transmitters and receivers from the same local oscillator domain and a second set of virtual array elements defined by one or more pairs of transmitters and receivers from different local oscillator domains, wherein synthesizing the virtual antenna array with the distributed aperture includes identifying one or more correlated points from one or more pairs of transmitters and receivers in at least one of the first and second sets of virtual array elements and applying a global phase correction for the one or more pairs of transmitters and receivers in the second set of virtual array elements using the one or more correlated points to compensate for temporal or spatial mismatches between the first and second sets of virtual array elements.

12. The method of claim 11, wherein applying the global phase correction is performed after performing a Doppler transformation operation for the one or more pairs of transmitters and receivers in the second set of virtual array elements.

13. The method of claim 11, wherein applying the global phase correction includes:
performing initial beamforming to generate a set of initial beamvectors;
performing a nearest neighbor spatial matching algorithm to identify the one or more correlated points;
generating a set of ideal beamvectors for at least one of the MIMO radar transceiver devices; and
generating the global phase correction by comparing the set of ideal beamvectors to the set of initial beamvectors.

14. The method of claim 11, wherein synthesizing the virtual antenna array with the distributed aperture includes aligning range profiles for the one or more pairs of transmitters and receivers in the second set of virtual array elements.

15. The method of claim 14, wherein aligning the range profiles for the one or more pairs of transmitters and receivers in the second set of virtual array elements is performed after performing a range transformation operation for the for the one or more pairs of transmitters and receivers in the second set of virtual array elements, and wherein synthesizing the virtual antenna array with the distributed aperture includes performing transmitter code demodulation for the one or more pairs of transmitters and receivers in the second set of virtual array elements after aligning the range profiles for the one or more pairs of transmitters and receivers in the second set of virtual array elements.

16. A method, comprising:
receiving radar data from a plurality of multiple input multiple output (MIMO) radar transceiver devices, each including one or more transmitters and one or more receivers disposed within a local oscillator domain; and
synthesizing a virtual antenna array with a distributed aperture using the radar data received from the plurality of MIMO radar transceiver devices, the virtual antenna array including a first set of virtual array elements defined by one or more pairs of transmitters and receivers from the same local oscillator domain and a second set of virtual array elements defined by one or more pairs of transmitters and receivers from different local oscillator domains;
wherein synthesizing the virtual antenna array with the distributed aperture includes aligning range profiles for the one or more pairs of transmitters and receivers in the second set of virtual array elements;
wherein aligning the range profiles for the one or more pairs of transmitters and receivers in the second set of virtual array elements is performed after performing a range transformation operation for the for the one or more pairs of transmitters and receivers in the second set of virtual array elements; and
wherein synthesizing the virtual antenna array with the distributed aperture includes performing transmitter code demodulation for the one or more pairs of transmitters and receivers in the second set of virtual array elements after aligning the range profiles for the one or more pairs of transmitters and receivers in the second set of virtual array elements.

* * * * *